J. W. SHEPERDSON.
ENGINE INDICATOR.
APPLICATION FILED MAR. 8, 1912.
1,056,950.
Patented Mar. 25, 1913.
4 SHEETS—SHEET 1.
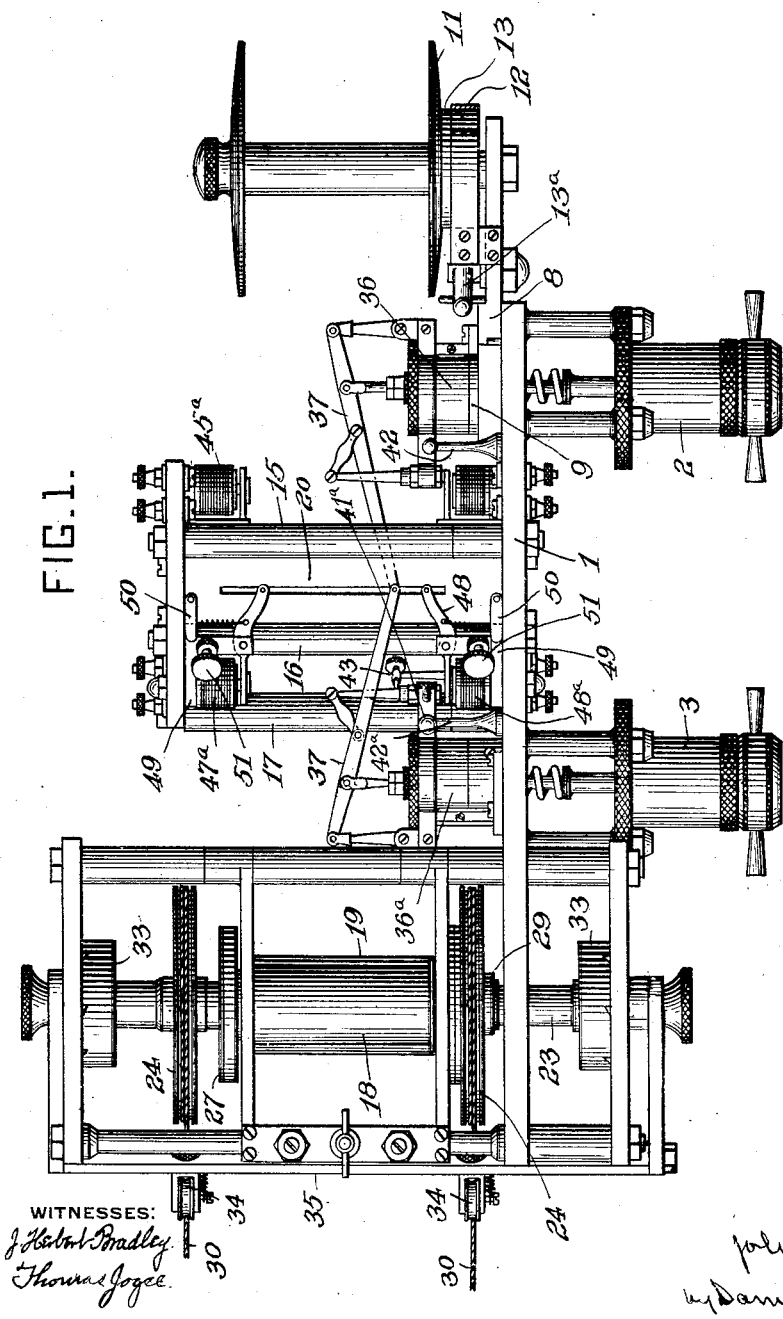

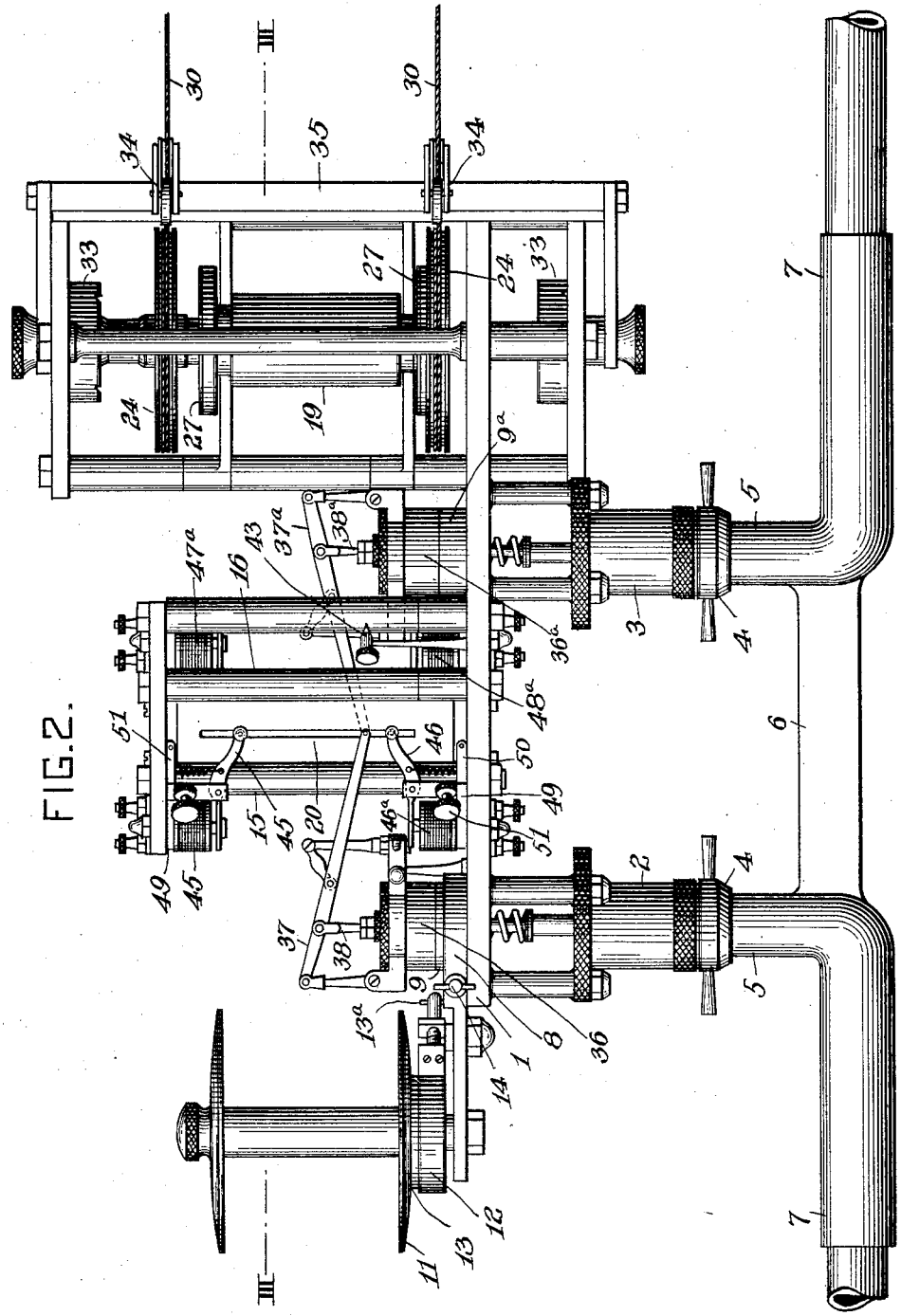

J. W. SHEPERDSON.
ENGINE INDICATOR.
APPLICATION FILED MAR. 8, 1912.
1,056,950.
Patented Mar. 25, 1913.
4 SHEETS—SHEET 3.
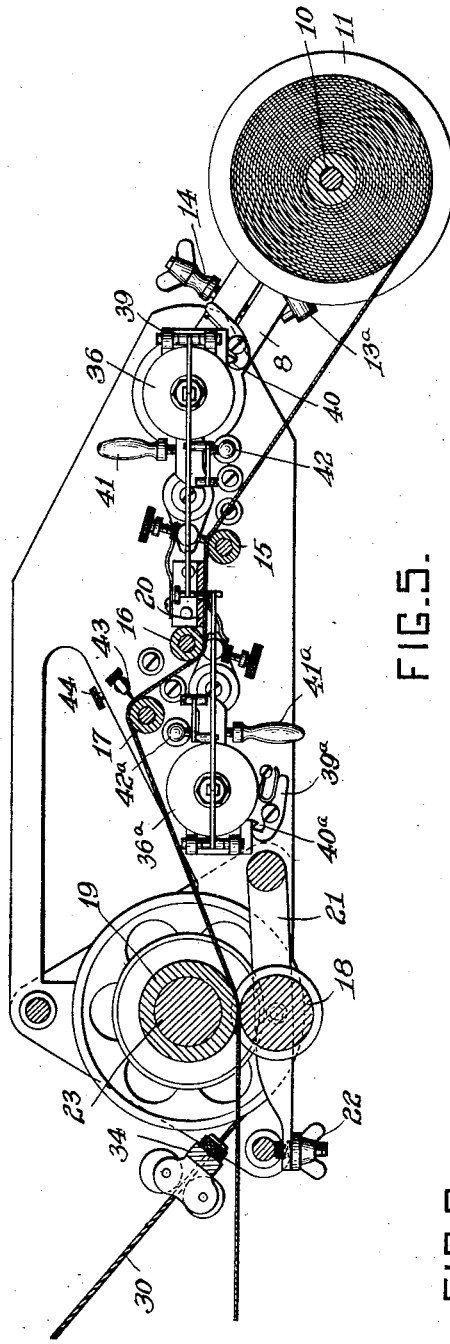
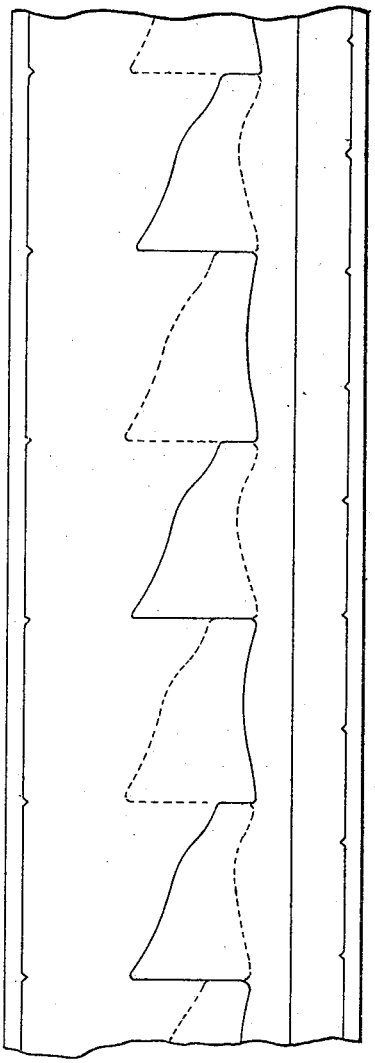
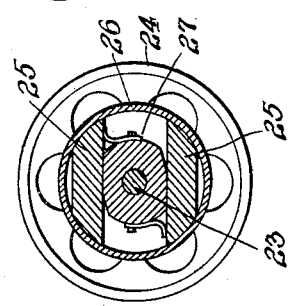
WITNESSES:
INVENTOR J. W. SHEPERDSON.
ENGINE INDICATOR.
APPLICATION FILED MAR. 8, 1912.
1,056,950.
Patented Mar. 25, 1913.
4 SHEETS—SHEET 4.
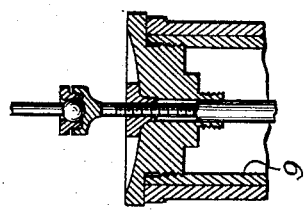
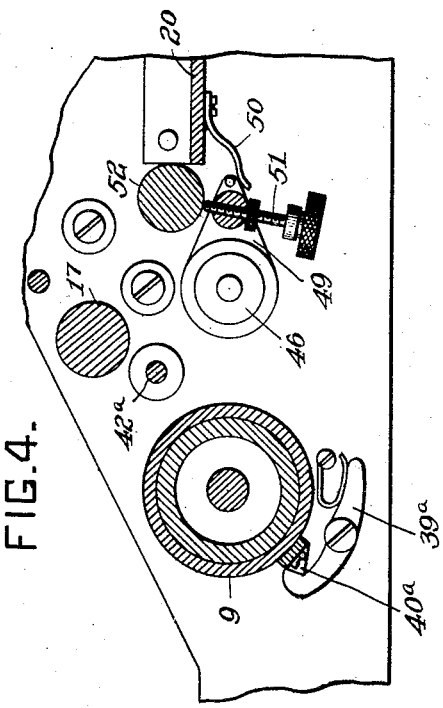
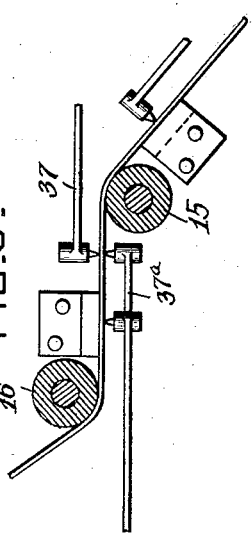

UNITED STATES PATENT OFFICE.

JOHN W. SHEPERDSON, OF JOHNSTOWN, PENNSYLVANIA, ASSIGNOR TO WILLIAM L. TRILL, OF CORRY, PENNSYLVANIA.

ENGINE-INDICATOR.

1,056,950.  Specification of Letters Patent.  Patented Mar. 25, 1913.

Application filed March 8, 1912. Serial No. 682,447.

*To all whom it may concern:*

Be it known that I, JOHN W. SHEPERDSON, residing at Johnstown, in the county of Cambria and State of Pennsylvania, a subject of Great Britain, have invented or discovered certain new and useful Improvements in Engine-Indicators, of which improvements the following is a specification.

The invention described herein relates to certain improvements in engine indicators and has for its object a construction and combination of parts or elements where simultaneous records may be formed of the variations in pressure at both ends of a cylinder, the ordinates of such records coinciding.

It is a further object of the invention to simultaneously form "open records on coinciding ordinals of the variations in pressure in both ends of the cylinder."

It is also an object of the invention to provide for the formation of records, of time intervals, dead centers, the imposition of loads, etc.

The invention is hereinafter more fully described and claimed.

In the accompanying drawings forming a part of this specification, Figures 1 and 2 are side elevations of opposite sides respectively of an indicator embodying the improvements claimed herein; Fig. 3 is a sectional plan view, the plane of section being indicated by the line III—III, Fig. 1; Fig. 4 is a sectional detail plan on a plane indicated by the line IV—IV, Fig. 1; Fig. 5 illustrates a card or record formed by the indicator; Fig. 6 is a sectional detail of the clutch mechanism for driving the winding roll; Fig. 7 is a sectional detail showing the adjustable connection between the marking lever and the rod operating the lever; and Fig. 8 is a sectional view illustrating a modification in the manner of supporting the continuous strip during the formation of the records.

In the practice of my invention the several parts or elements are supported by a base plate 1 to the underside of which are secured the cylinders 2 and 3 adapted to be connected by screw couplings to pipes leading to opposite ends of the cylinder of the engine. In order to adapt the pipe connections to engine cylinders of different lengths it is preferred to employ a construction substantially similar to that shown in Fig. 2 consisting of two nozzle portions 5 threaded for the reception of the couplings 4. These nozzle portions are held in suitable relation by means of a bar 6, and the connections between the nozzle portions and the points of attachment to the engine cylinder, are formed in part by telescopic joints 7.

An arm 8 is adjustably supported by a hollow boss or projection 9 formed on the upper side of the base plate in line with the cylinder 2, and in this arm is secured a spindle 10 on which is loosely mounted the spool 11 having wound thereon the strip of paper on which the records are to be found. In order that the strip may be held under sufficient tension a brake device is applied to the spool, such for example as that shown consisting of a strap 12 passing around a drum 13 on the lower end of the spool and having an end attached to the arm 8 while the opposite end is secured to an adjusting screw 13ᵃ. The arm 8 is split as shown in Fig. 3 and is adapted to be secured in position by a screw 14 passing through the divided portions of the arm. In the construction shown the strip of paper is passed from the spool on one side of a loosely mounted roller 15 and the opposite side of a similar roller 16, thence partially around a roller 17 and between the feeding rollers 18 and 19 to receiving spool (not shown). A strip supporting plate 20 is so arranged between the rollers (*i. e.* approximately tangential to opposite sides of both) as to bear firmly and evenly in one face as clearly shown in Figs. 1, 2 and 3.

The feed roller 18 is loosely mounted preferably in a swinging frame 21, whereby it may be shifted so as to bear with any desired pressure against the strip passing across the surface of the roller 19, said surface being preferably formed of rubber or other material adapted to frictionally grip the surface of the strip. The movement of the swinging frame to regulate the pressure of the roller 18 may be effected by any suitable means as the thumb screw 22.

The driven roller 19 is secured in a vertical shaft 23, on which driving drums 24 are also mounted in such manner as to be capable of rotation thereon. These driving drums are preferably arranged at opposite ends of the roller and suitable means are employed whereby the drums will engage the roller alternately and when positively driven. The driving connections between the drums and rollers are preferably effected by clutch mechanisms, consisting of dogs or pawls 25 arranged within the flanges 26 on the disks 27, and between these dogs are arranged double cams 28 which are moved relatively and in the proper direction to cause the dogs to engage the flanges and form driving connections between the disks and cams. As it is desired that a continuous movement in the same direction should be imparted to the roller 19, and as the drums are positively driven in the same direction as will be hereinafter described the clutch mechanisms are oppositely arranged at the ends of the roller 19. As for example at the upper end of the roller the flanged disk 27 is secured to the shaft 23, and the cam 28 to the lower end of the hollow shaft carrying the upper driving drum. At the lower end of the roller 19 the flanged disk is secured to the hollow shaft 29 carrying the lower drum and the cam 28 is secured to the shaft 23. This reverse manner of connecting the roller 19 to the drums permits the rotation of both drums, in the same direction. The drums are positively rotated by cords 30 wound in the same direction on the drums and extended to the crank or other suitable part of the engine, but so arranged over suitable guide pulleys that one cord will be pulled during the movement of the piston in one direction, and the other cord during the other half of the piston movement. The return rotation of the drums is effected by coiled springs 32 arranged in shells 33 and having their ends connected respectively to the drums and some stationary abutment. In order to lead the cords properly from the drums, guides 34 are mounted in an adjustable frame 35, which can be shifted to suit the direction in which the cords extend to the engine.

On the hollow bosses 9, 9ᵃ arranged on the upper side of the base-plate and in line with the cylinders 2 and 3 are mounted the sleeves 36, 36ᵃ on which are mounted the usual or any suitable supports for the levers 37, 37ᵃ having flexible and adjustable connections to the piston rods 38, 38ᵃ. It will be observed that the cylinders 2 and 3, the guide rollers 15 and 16 and strip supporting plate 20, are arranged in such relation that one of the levers as 37 will move up and down one side of the strip or plate 20 while the other lever will have the same movement on the opposite side of the strip or plate, which is vertically slotted so that the point carried by the lever 37 will bear on the back side of the strip. The sleeves 36, 36ᵃ carrying the levers or fingers 37, 37ᵃ are held so that the points or pencils carried by the fingers or levers will be yieldingly held in contact with the strip by suitable means such for example as that shown, consisting of spring actuated dogs 39, 39ᵃ bearing upon inclined projections 40, 40ᵃ carried by the sleeves. The movement of the sleeves by the spring actuated dogs, is limited by the adjustable stops 41, 41ᵃ consisting of screws passing through lugs on the sleeves and bearing against abutments 42, 42ᵃ.

The atmospheric pressure line $a$ (see Fig. 5) is marked on the strip by a point or pencil carried by the finger 43, which is adjustably supported in a suitable manner. As for example in the construction shown, the lower end of the finger is passed through an opening in the bed plate, and is held in position vertically by a set screw 44, as shown in Figs. 2 and 3.

In addition to recording the variations of pressure in both ends of the engine cylinder, provision is made for indicating the dead centers, intervals of time, the imposition of loads on the engine and any other data that may be desirable, so that the record when formed will contain all data necessary to determine the efficiency of the engine, etc.

For forming the records above stated, of dead centers, etc., levers or fingers 45, 46, 47 and 48 are employed. These parts are formed on or secured to the armatures or electro-magnets 45ᵃ, 46ᵃ, 47ᵃ and 48ᵃ, which in order to permit the fingers to be moved into and out of contact with the strip, are carried by plates 49 movably mounted on the base plate. These carrier plates are provided with radial extensions forming bearing points for the springs 50 whereby the carrier plates are so turned that the points or pencils will be yieldingly held against the strip. In order to prevent the points or pencils being pressed too greatly against the strip, adjustable stops are provided, preferably in the form of screws 51 passing through studs 52 on the radial extensions of the plates and bearing against suitable abutments. The circuit of the electro-magnet 45ᵃ designed to indicate the dead centers includes a make and break mechanism arranged to be operated by the crank as it passes the centers or by some other part of the engine moving synchronously with the crank at opposite ends of its range of movement. This magnet should be so arranged that the pencil or point will move in the same vertical plane as the points carried by the levers or fingers 37, 37ᵃ, and indicating variations of pressure in the ends of the cylinder. One of the other magnets as 46ᵃ has its circuit controlled by a clock so that the point carried by the finger 46 will indicate on the strip equal intervals of time, as seconds. The other magnets 47ᵃ, 48ᵃ, are included in circuits having make and break mechanisms, which can be operated automatically or by hand to indicate the imposition of a load on the engine, as the entrance of a piece of metal between the rolls of a rolling mill, or to indicate any other event of which it is desirable to form a record on the strip.

It is characteristic of my improved indicator that records of variations of pressure in both ends of the engine cylinder are formed simultaneously and on exactly the same ordinates, and hence in calculating these records no allowances or adjustments have to be made. If the strip were of transparent material the two records could be seen at once, one superposed on the other. It is also characteristic of my improvement that the indications of the dead centers have exactly the same relation to each of the pressure records.

I claim as my invention:

1. In an indicator, the combination of means for supporting a strip of paper, and means for simultaneously recording variations of pressure in a cylinder on opposite sides of the strip.

2. In an indicator, the combination of means for feeding a strip of paper, and means for simultaneously recording variations of pressure in a cylinder on opposite sides of the strip.

3. In an indicator, the combination of means for continually feeding a strip of paper, and means for simultaneously recording variations of pressure in a cylinder on opposite sides of the strip.

4. In an indicator, the combination of means for supporting a strip of paper and means for simultaneously recording variations of pressure in opposite ends of a cylinder on opposite sides of the strip.

5. In an indicator, the combination of means for continuously feeding a strip of paper, and means for forming records of variations of pressure in opposite ends of the cylinder on opposite sides of such strip, said records having coincident ordinates.

6. In an indicator, the combination of means for supporting a strip of paper, means for indicating dead centers on said strip, and means for simultaneously forming records of variations of pressure in opposite ends of an engine cylinder on opposite sides of the strip and in identical relations to the dead center indications.

7. In an indicator, the combination of means for continuously feeding a strip of paper, means for indicating time intervals on said strip, and means for simultaneously forming records having coincident ordinates of variations of pressure in both ends of a cylinder on opposite sides of the strip.

8. In an indicator, the combination of means for continuously feeding a strip of paper, means for forming records having coincident ordinates of variations of pressure in both ends of engine cylinders on opposite sides of the strip, and means for marking indications of changes of load on the engine.

In testimony whereof, I have hereunto set my hand.

JOHN W. SHEPERDSON.

Witnesses:
   DAVID MEARKER,
   JOHN F. HENDERSON.

---

Copies of this patent may be obtained for five cents each, by addressing the "Commissioner of Patents, Washington, D. C."